United States Patent
Goto et al.

[11] Patent Number: 6,091,375
[45] Date of Patent: Jul. 18, 2000

[54] RADOME

[75] Inventors: Tomoji Goto, Tokyo; Akihito Fujii, Nishinomiya; Chihiro Kawai, Takarazuka, all of Japan

[73] Assignee: Sumitomo Electric Industries, Ltd., Osaka, Japan

[21] Appl. No.: 08/881,128

[22] Filed: Jun. 24, 1997

[30] Foreign Application Priority Data

Jun. 25, 1996 [JP] Japan .................................. 8-164689

[51] Int. Cl.[7] ............................. B64C 1/14; C04B 37/02; C30B 29/20; F42B 10/46
[52] U.S. Cl. ........................ 343/872; 428/34.4; 428/34.6; 428/36.5
[58] Field of Search ................................ 428/34.4, 34.6, 428/34.7, 36.5; 343/700 MS, 705, 872

[56] References Cited

U.S. PATENT DOCUMENTS

| | | | |
|---|---|---|---|
| 4,642,299 | 2/1987 | Hsieh ........................................ | 501/97 |
| 4,677,443 | 6/1987 | Koetje et al. ............................ | 343/872 |
| 5,069,697 | 12/1991 | Hamaguchi et al. ..................... | 55/523 |
| 5,515,054 | 5/1996 | Radford et al. .......................... | 342/53 |
| 5,801,073 | 9/1998 | Robbins et al. .......................... | 438/125 |
| 5,834,840 | 11/1998 | Robbins et al. ........................ | 257/705 |

FOREIGN PATENT DOCUMENTS

| | | |
|---|---|---|
| 63-173403 | 7/1988 | Japan . |
| 3-241300 | 10/1991 | Japan . |

OTHER PUBLICATIONS

Misra et. al., "Synthesis and Properties of Some New Fluorine–Containing Polyimides", Polymer, vol. 33, No. 5, pp. 1078–1082, 1992.

Hougham et. al., "Synthesis and Properties of Highly Fluorinated Polyimides", Macromolecules, vol. 27, pp. 3642–3649, 1994.

*Primary Examiner*—Ellis Robinson
*Assistant Examiner*—John Figueroa
*Attorney, Agent, or Firm*—McDermott, Will & Emery

[57] ABSTRACT

Radome which is mainly constituted of at least one porous ceramic material. The radome is useful as a cover for protecting a radar, which is excellent in weather resistance, machinability and relative dielectric constant. The porous ceramic radome material may be coated or impregnated with a resin, amorphous silica or borosilicate glass in order to improve the tightness and the resistance to heat and oxidation.

11 Claims, 2 Drawing Sheets

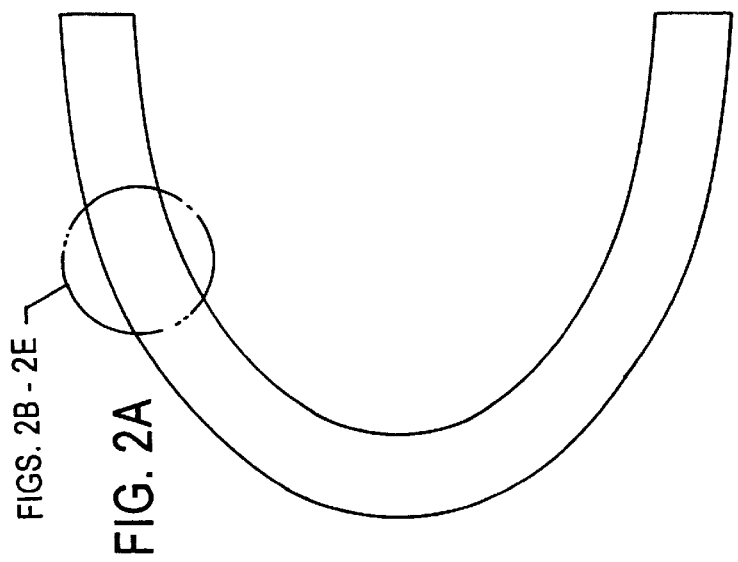
FIG. 2A
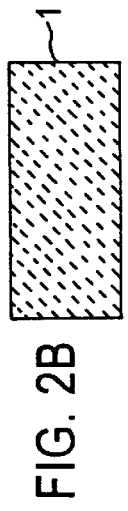
FIG. 2B
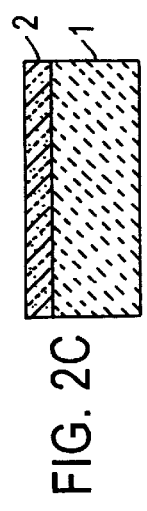
FIG. 2C
FIG. 2D
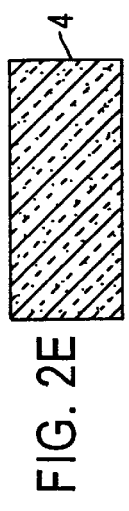
FIG. 2E
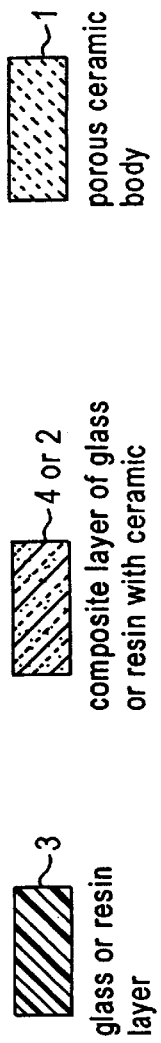

RADOME

BACKGROUND OF THE INVENTION

1. Field of the Invention

The present invention relates to a cover for a static or moving radar to be used for protecting it.

2. Description of the Prior Art

A radome is used as a protecting cover for a radar, and the performance requirements thereof depend upon whether the radome is used on the ground or a ship or in a missile or aircraft.

The role of a radome to be used on the ground or a ship is to protect a radar from the surrounding severe meteorological conditions. On the other hand, a missile or aircraft is generally equipped with a radar at the front, so that a radome to be used in a missile or aircraft must have excellent aerodynamic characteristics, and must, of course, withstand the severe atmospheric conditions.

In addition to these performance requirements, it is also important that a radome does not act as an electrical shield against radio waves which are essential to a radar system. In particular, the material of a radome is required to have an ability to transmit radio waves, and therefore is selected from those having low dielectric loss (tan $\delta$) and low relative dielectric constant ($\epsilon_r$) These properties serve to enhance the radio wave transmission of a radome.

In the prior art, studies on the material of a radome were made mainly from the standpoints of radio wave transmission properties, so that most of the radomes of the prior art were made of FRPs (fiber reinforced plastics), ceramics, resin foams or combinations of two of more of them. In particular, radomes to be used on the ground or a ship are generally made of FRPs with the main purpose of enhancing the weather resistance, while radomes to be used at the front of an aircraft or missile are generally made of ceramics or reinforced ceramics under the necessity of enhancing the heat resistance.

A radio wave transmitting material made by using a ceramic fiber has recently been disclosed (in Japanese Patent Laid-Open No. 173403/1988), but the point of this disclosure is also to use FRPs or FRCs (fiber reinforced ceramics).

Further, radomes made by using light-transmitting ceramics have also been disclosed for use in the field necessitating the transmission of light (Japanese Patent Laid-Open No. 241300/1991). However, the material usable in this case is severely restricted, because it is required to transmit not only radio waves but also light.

As described above, a radome has various uses. Radomes made of resins causes degradation owing to the poor weather resistance of the resins. On the other hand, ceramic radomes also have the following problems: ceramics themselves are difficult of machining; the ceramics used in producing radomes to be used on the ground or a ship must be improved in weather resistance, while those used in producing a radomes for an aircraft or missile must be improved in both weather resistance and machinability; and the usable frequency of a radar system depends on the relative dielectric constant ($\epsilon_r$) of the ceramics used.

SUMMARY OF THE INVENTION

The present invention has been made for the purpose of solving the above problems, and relates to a radome which is mainly constituted of at least one porous ceramic material. Although ceramics having various relative dielectric constants are known, the relative dielectric constants are lowered by making the ceramics in a porous structure, and this lowering is particularly remarkable when the porosity is enhanced to 35% by volume or above.

The porous ceramic radome material must be excellent in strength and weather resistance to meet the requirements for a radome, and is further required to have excellent heat resistance when the radome is used in a fast missile. It is therefore preferable that the radome material be composed of at least one member selected from the group consisting of oxides, nitrides, oxynitrides and double oxides of Si and Al. The most preferable radome materials are porous ceramics mainly comprising $Si_3N_4$ because the ceramics exhibit small tan $\delta$ and $\epsilon_r$ values and are excellent in heat resistance and strength.

Further, it is preferable that the radome materials made of porous ceramics be improved in tightness by surface-coating them with a resin or by impregnating them with a resin to fill the pores therewith. This coating or impregnation gives a tight film on the surface of the material or inside it to inhibit the penetration of gases such as air or liquids such as water into the material. The resin to be used in this case is preferably a heat-resistant one, which may be at least one member selected from the group consisting of polyesters, silicones, polyimides and epoxy resins. The epoxy resin to be used is preferably selected from the group consisting of phenol-type ones, cresolic novolak-type ones and polyfunctional amine type ones (such as triglycidiyl-m-aminophenol), all of which are excellent in heat resistance. In producing a radome to be used in an aircraft or the like, the use of a polyimide or silicone is particularly preferable, because heat resistance is an important factor to such a radome.

In order to further improve the resistances of the porous ceramics to heat and oxidation, the ceramics may be coated or impregnated with amorphous silica, borosilicate glass or a material easily convertible into amorphous silica instead of the above resin. Such coating or impregnation can give a tight layer. Examples of the process for coating or impregnating the ceramic materials with amorphous silica include (1) a process which comprises dispersing amorphous silica powder having a diameter of 0.05 to 30 $\mu$m in a solvent (such as water or alcohol) containing a dispersing agent to prepare a colloidal solution, impregnating or coating the ceramics with this colloidal solution and subjecting the resulting ceramics to heat treatment at a temperature of the softening point of silica glass or above in the atmosphere, (2) a process which comprises impregnating or coating the ceramics with a solution of a metal alkoxide such as ethyl silicate and subjecting the resulting ceramics to heat treatment (at 500° C. or above) in air to thereby convert the metal alkoxide into amorphous silica, and (3) a process which comprises coating or impregnating the ceramics with an aqueous solution of silicon hydroxide or hydrate (such as inorganic adhesive) and subjecting the resulting ceramics to heat treatment (at 100° C. or above) in air to thereby harden the silicon hydroxide hydrate through dehydration.

When a large-sized radome is required as the form of use, porous ceramic plates are used in combination, using a fixing frame. In this case, a better radome can be built by using different kinds of porous ceramics which are selected in consideration of the wave absorption characteristics of ceramics. Of course, the tightness of such radomes can be enhanced by preliminarily coating or impregnating the porous ceramics with a resin.

A compact radome to be used for protecting a small-sized radar can be constituted of a cylindrical porous ceramic material and a disc-like porous ceramic material. In this case as well as in the above case, the radio wave absorption characteristics of the radome material can be controlled by selecting the kinds of the cylindrical porous ceramic material and the disc-like porous ceramic material. Still preferable results can be attained by making cylinders out of several kinds of porous ceramics and piling up them. In this case as well as in the above production of a large-sized radome, the porous ceramic cylinder and/or disc may be coated or impregnated with a resin.

A missile or aircraft is generally equipped with a radar at the front thereof, so that the radome used for protecting the radar has a parabolic or hemispherical shape exhibiting low air resistance. The radome is desirably a solid one which may be produced by working a porous ceramic block, though it can also be constituted by combining porous ceramic materials, using a frame.

When the radome of the present invention is used in a fast missile, the heat resistance of ceramics is particularly effective. Further, porous ceramics are easily machinable, light and tough owing to of their porous form. A radome to be used in such a missile can be produced by working a porous ceramic block into a predetermined shape and coating or impregnating the resulting work with a resin to improve the tightness of the work.

BRIEF DESCRIPTION OF THE DRAWING

FIG. 2A illustrates a ceramic shaped into a parabolic shape.

FIG. 2B shows a cross-section of a ceramic prior to coating or impregnation.

FIGS. 2C–2E illustrate cross-sections of the surface coated ceramic in accordance with embodiments of the present invention.

DETAILED DESCRIPTION OF THE PREFERRED EMBODIMENTS

Figure 1:
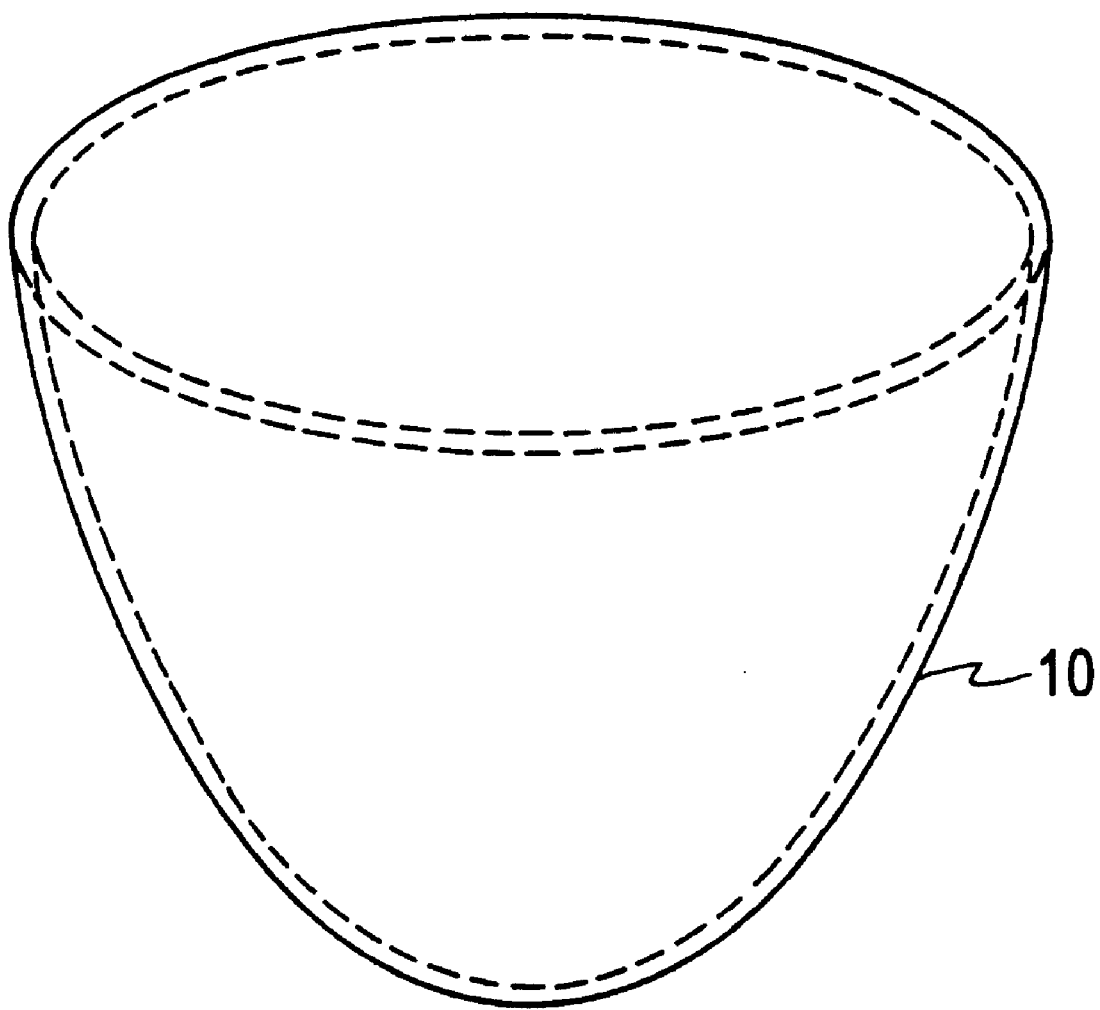
FIG. 1 is a schematic illustration of a parabolic work of a porous ceramic material according to the present invention.

In the production of a ceramic article according to the present invention, a sintering aid (such as rare earth element oxides) and a binder are added to a ceramic powder as the base material and is mixed in a solvent (such as water or ethanol) to form a slurry.

The forming of ceramics is conducted by a process which comprises drying the above slurry by spray drying or the like to form a granulated powder and molding this granulated powder by an embossed press molding, a cold isostatic pressing (CIP), or a process called "slip casting" which comprises pouring the slurry into a casting mold and molding it. The compact thus obtained is freed from the binder at a predetermined temperature, and thereafter sintered. The porous ceramics can be produced by, e.g., the following process: a silicon nitride powder mainly comprising α-silicon nitride and having a mean diameter of 0.3 μm is mixed with a yttrium oxide powder having a mean diameter of 0.5 μm; the obtained mixture is milled in a ball mill in the presence of ethanol as solvent for 72 hours to thereby obtain a mixed powder; the mixed powder is dried, followed by the addition of a forming auxiliary; the resulting powdery mixture is molded under pressing; and the resulting compact is fired under the conditions of a temperature of 1,700° C. and partial pressure of nitrogen of 4 atm for 2 hours. In this production, the porosity of the obtained sintered body can be controlled by selecting the amount of yttrium oxide added without any change in the firing conditions. In the present invention, a $Si_3N_4$ sintered body having a porosity of 50% is obtained by adding yttrium oxide in an amount of 9% by weight. Thus, the porous ceramics can be produced, though it may be produced by other process. Further, porous ceramics wherein the pores are fine and present in a closed state are preferable in strength.

Such porous ceramics are little restricted by the production process in sizes or shape, so that a large-sized member having sizes of 200 mm or above can easily be produced. After the completion of the firing, the surface of the resulting sintered body may be uniformly finished by cutting or polishing. The cutting and polishing of a porous ceramic product are relatively easy by virtue of the excellent machinability thereof, though a dense ceramic product is poor in machinability owing to its high hardness to result in difficult cutting or polishing. In particular, a porous ceramic product having a porosity of 50% or above can be worked by a conventional cutter.

In the present invention, ceramics are used in the form of a porous body, so that the starting powdery material is required to exhibit excellent sintering characteristics and to give a sintered body excellent in strength, heat resistance and weather resistance. It is preferable to meet these requirements that the material comprises at least one member selected from the group consisting of $Si_3N_4$, $Al_2O_3$, AlN and $SiO_2$ as the main component. Further, a rare earth oxide is used as an auxiliary for forming a porous body. A combination of $Si_3N_4$ with $Y_2O_3$ is most preferable.

As described above, the shape of the radome of the present invention depends upon whether the radome is used in a static state or in a flying state. In producing a radome used in the former state, the material and thickness of the plate are selected from the standpoints of the tan δ and $\epsilon_r$ of the resulting porous ceramics and the wavelength used. It is well known that the these properties of a porous ceramic material at various frequency ranges are different depending on the type of the ceramic material. Further, the rate of radio wave absorption of ceramics per unit thickness are lowered by making a porous structure, so that porous ceramics are advantageous also in this respect as the material of a radome.

Additionally, the tightness and mechanical strengths of the radomes can be improved by coating or impregnation the porous ceramics with a resin. The resin to be used in this case may also be selected in consideration of relative dielectric constant and dielectric loss. Resins thus selected are given in Table 1.

TABLE 1

| Material | Relative dielectric constant | Dielectric loss | Frequency used for measurement |
|---|---|---|---|
| polyester | 2.70 | 0.001 | 10 GHz |
| polyimide (PI) | 3.27 | 0.0075 | 10 GHz |
| polyether sulfone (PES) | 3.37 | 0.013 | 10 GHz |
| polyether ether ketone (PEEK) | 3.20 | 0.003 | 10 GHz |
| epoxy | 2.78 | 0.001–0.020 | 10 GHz |
| polyphenylene oxide (PPO) | 2.81 | — | 10 GHz |

TABLE 1-continued

| Material | Relative dielectric constant | Dielectric loss | Frequency used for measurement |
|---|---|---|---|
| polycarbonate (PC) | 3.00 | — | 10 GHz |
| polysulfone (PS) | 3.30 | — | 10 GHz |
| polyether imide (PEI) | 2.85 | 0.0075 | 94 GHz |
| silicone | 3.00 | 0.001 | 1 MHz |
| polycyanate ester (CE) | 2.70 | 0.002 | 10 GHz |

The coating of the porous ceramic members with a resin may be conducted by any process, which may be selected from the group consisting of a process of spraying the ceramics a resin having a controlled molecular weight and a viscosity regulated with a solvent, etc., a process of applying such a resin to the ceramics by the use of a roller, a process of dipping the ceramics in a resin solution, a spin coating process and so on.

The impregnation of the porous ceramics with a resin can be conducted by injecting a liquid resin thereinto, or by dipping the members in a resin solution, or by other means. The impregnating operation may be repeated, when no sufficient effect can be attained by one impregnation run.

When the coating or impregnating of the porous ceramics with amorphous silica is conducted by using a metal alkoxide, the above means can be employed after formulating the metal alkoxide into a liquid having a suitably regulated viscosity. The temperature to be employed in immobilizing the metal alkoxide on the porous ceramics is changed.

When finely divided silica is used in coating or impregnating the porous ceramics, the coating or impregnation can be conducted by dispersing the silica in a solvent containing a dispersing agent and applying the obtained dispersion to the porous ceramics by the above means. The radomes made by using the ceramics thus treated are high-quality ones having both high radio wave transmission due to the low relative dielectric constant and low dielectric loss and excellent heat resistance and tightness.

Both a radome to be used on the ground and one for a ship are required to have excellent weather resistance. Porous ceramics are advantageous in this respect, because they are excellent in heat resistance, serve as a barrier to the outside heat, and do not cause ultraviolet degradation unlike resins to be excellent in durability. Although the frame to be used in such a radome may be made of a resin, metal, ceramics or the like, it is more effective in durability to use a metal or ceramic frame excellent in weather resistance.

A cylindrical radome according to the present invention can be produced by making a cylinder only out of a porous ceramic without any frame and placing a porous ceramic disc on the cylinder, which is because a porous ceramic has sufficiently high strength. Such a constitution is suitable for small-sized radomes.

A radome for a missile according to the present invention is preferably produced by forming a porous ceramic block having larger sizes than those of a final product and cutting the block into design sizes. Such a radome can also be produced by assembling plates, but the resulting radome is poor in reliability. Porous ceramics permit machining, so that it may be worked in a similar manner to that of the working of a metal.

FIG. 2A illustrates a ceramic shaped into a parabolic shape and the cross-sections of the surface-coated or impregnated ceramic are shown in FIGS. 2C–2E. FIG. 2B illustrates the cross-section of the ceramic prior to coating or impregnation. FIG. 2C shows the cross-section of the surface-coated ceramic having a composite layer 2 on one or both sides of a ceramic 1. FIG. 2D shows a ceramic 1 having a composite layer 2 and a layer 3 of glass or resin on side or both sides thereof. FIG. 2E shows an impregnated ceramic 4.

EXAMPLE 1

$Y_2O_3$ powder having a mean diameter of 0.5 μm and a polyvinyl alcohol (PVA) as a binder were added to a $Si_3N_4$ powder having a mean diameter of 0.3 μm and comprising α-$Si_3N_4$ as the main component, with the amount of the $Y_2O_3$ powder being 9 wt %. The obtained mixture was milled in a ball mill in the presence of ethanol as solvent for 72 hours. The resulting powdery mixture was dried, granulated and formed by pressing into a block.

This block was fired under the conditions of a temperature of 1,700° C. and partial pressure of nitrogen of 4 atm for 2 hours. The resulting block had a porosity of 50% by volume. If a higher porosity is desired, porous ceramics having any enhanced porosity can be produced by increasing the amount of $Y_2O_3$ added under firing conditions similar to the above ones.

Porous ceramic blocks of $SiO_2$ and $Al_2O_3$ having a porosity of 50% by volume were produced in a similar manner to that employed above except that the firing temperature was changed. These blocks had sizes of about 250 mm. The blocks were each worked into parabolic products as shown in the FIG. 1. These parabolic products were examined for transmitted frequencies in the range of 1 to 20 GHz (wherein a transmittance loss of less than −3 dB was regarded as "transmitted"). Further, these porous ceramics were also examined for bending strength by the use of separately prepared test pieces. The results are given in Table 2. It can be understood that the porous ceramics exhibit wide transmitted wave frequencies and are satisfactory in mechanical strength, thus being useful as the material of radomes.

TABLE 2

| | porous $Si_3N_4$ | porous $Al_2O_3$ | porous $SiO_2$ |
|---|---|---|---|
| Transmitted frequency (GHz) | 1–8 9–16.5 17.5–20 | 1–4 5–9 10–19 | 1–7 8–15 16–20 |
| Bending strength (kg/mm$^2$) | 20 | 8 | 1.2 |

EXAMPLE 2

As shown in Table 3, porous ceramic discs, cylinders and blocks of $Si_3N_4$, $Al_2O_3$, AlN, fused silica and mullite ($3Al_2O_3·2SiO_2$) having porosities of 35 to 55% were produced in similar manners to that of Example 1.

The obtained porous ceramic products were worked and thereafter coated or impregnated with resins listed in Table 3. The impregnation with a resin was conducted by putting each porous ceramic product in a vacuum chamber, dipping the product in a resin in a vacuum 50 Torr or below and pressuring the chamber to make it impregnated with the resin. The coating with a resin was conducted by making a resin adhere to the surface of each porous ceramic product by dipping and drying and heating the resulting product. The resulting resin layer had a thickness of 0.2 mm.

Porous ceramic products coated or impregnated with amorphous silica were produced in similar manners to those described above. As to borosilicate glass, only coated porous ceramic products were produced.

The radomes thus produced were examined for relative dielectric constant, dielectric loss, radio wave transmittance, strength and heat resistance. The results are given in Table 3. The measurements of these characteristics were conducted as follows.

The measurements of relative dielectric constant ($\epsilon_r$) and dielectric loss (tan δ) were conducted by the use of a sample (10 mm×22.8 mm×t mm). The thickness (t) of a sample depended on the material of the sample. In these measurements, each sample used here was worked into a thickness nearly equivalent to that used in the determination of radio wave transmittance. Each sample was set on a wave guide and measured for resonance frequency and intensity of transmitted radio wave at about 10 GHz by the use of a network analyzer. The relative dielectric constant and dielectric loss of the sample were determined based on the results of this examination.

The measurement of radio wave transmittance was conducted by producing a hemispherical dome having a radius of 100 mm and measuring the intensity of wave received by an antenna in both the case wherein the radome was used and the case wherein no radome was used. The measurement of transmittance of radio wave was conducted at three frequencies, i.e., 2, 10 and 25 GHz.

The measurement of strength was conducted by three-point bending test according to JIS R1601.

The evaluation of heat resistance was conducted by exposing each porous ceramic product to high temperature of 300° C. or 500° C. in the atmospheric air by the use of a thermostatic chamber for one hour to determine the weight change.

TABLE 3

| No. | Material | Porosity (%) | Impregnating material | Coating material | Relative dielectric constant $\epsilon_r$ | Dielectric loss tan σ(%) | Thickness (mm) | Wave transmittance (%) 2 GHz | 10 GHz | 25 GHz | Bending strength (kg/mm$^2$) | Heat resistance (° C.) |
|---|---|---|---|---|---|---|---|---|---|---|---|---|
| 1 | Si$_3$N$_4$ | 40 | — | — | 3.7 | 0.06 | 7.8 | 85 | 99 | 66 | 27 | >500 |
| 2 | Si$_3$N$_4$ | 50 | — | — | 3.0 | 0.05 | 8.7 | 90 | 99 | 75 | 20 | >500 |
| 3 | Si$_3$N$_4$ | 55 | — | — | 2.7 | 0.05 | 9.1 | 91 | 99 | 79 | 15 | >500 |
| 4 | Si$_3$N$_4$ | 50 | polyester | — | 4.9 | 0.10 | 6.8 | 78 | 99 | 56 | 23 | <300 |
| 5 | Si$_3$N$_4$ | 50 | silicone | — | 5.2 | 0.10 | 6.6 | 77 | 99 | 54 | 21 | >300 |
| 6 | Si$_3$N$_4$ | 50 | polyimide | — | 5.4 | 0.43 | 6.4 | 75 | 97 | 52 | 24 | >300 |
| 7 | Si$_3$N$_4$ | 50 | silica | — | 5.8 | 0.08 | 6.2 | 74 | 99 | 50 | 40 | >500 |
| 8 | Si$_3$N$_4$ | 50 | — | polyester | 3.2 | 0.06 | 8.4 | 89 | 99 | 73 | 21 | <300 |
| 9 | Si$_3$N$_4$ | 50 | — | silicone | 3.2 | 0.06 | 8.4 | 88 | 99 | 73 | 20 | <300 |
| 10 | Si$_3$N$_4$ | 50 | — | polyimide | 3.2 | 0.09 | 8.4 | 88 | 99 | 73 | 21 | >300 |
| 11 | Si$_3$N$_4$ | 50 | — | silica | 3.2 | 0.05 | 8.4 | 88 | 99 | 72 | 21 | >500 |
| 12 | Si$_3$N$_4$ | 50 | — | borosilicate glass | 3.3 | 0.06 | 8.3 | 88 | 99 | 72 | 22 | >500 |
| 13 | Al$_2$O$_3$ | 35 | — | — | 4.2 | 0.07 | 7.3 | 82 | 99 | 62 | 11 | >500 |
| 14 | Al$_2$O$_3$ | 50 | — | — | 3.0 | 0.05 | 8.6 | 89 | 99 | 74 | 8 | >500 |
| 15 | Al$_2$O$_3$ | 55 | — | — | 2.7 | 0.05 | 9.1 | 91 | 99 | 79 | 7 | >500 |
| 16 | Al$_2$O$_3$ | 50 | polyester | — | 5.0 | 0.10 | 6.7 | 78 | 99 | 55 | 10 | <300 |
| 17 | Al$_2$O$_3$ | 50 | silicone | — | 5.3 | 0.10 | 6.5 | 77 | 99 | 54 | 8 | <300 |
| 18 | Al$_2$O$_3$ | 50 | polyimide | — | 5.5 | 0.43 | 6.4 | 75 | 97 | 51 | 11 | >300 |
| 19 | Al$_2$O$_3$ | 50 | silica | — | 5.8 | 0.08 | 6.2 | 74 | 99 | 50 | 11 | >500 |
| 20 | Al$_2$O$_3$ | 50 | — | polyester | 3.2 | 0.06 | 8.4 | 88 | 99 | 73 | 9 | <300 |
| 21 | Al$_2$O$_3$ | 50 | — | silicone | 3.2 | 0.06 | 8.4 | 88 | 99 | 72 | 8 | <300 |
| 22 | Al$_2$O$_3$ | 50 | — | polyimide | 3.2 | 0.09 | 8.4 | 88 | 99 | 72 | 10 | >300 |
| 23 | Al$_2$O$_3$ | 50 | — | silica | 3.2 | 0.05 | 8.3 | 88 | 99 | 72 | 9 | >500 |
| 24 | Al$_2$O$_3$ | 50 | — | borosilicate glass | 3.3 | 0.06 | 8.3 | 88 | 99 | 71 | 10 | >500 |
| 25 | AlN | 35 | — | — | 4.0 | 0.07 | 7.5 | 83 | 99 | 64 | 9 | >500 |
| 26 | AlN | 50 | — | — | 2.9 | 0.05 | 8.8 | 90 | 99 | 76 | 5 | >500 |
| 27 | AlN | 55 | — | — | 2.6 | 0.05 | 9.3 | 92 | 99 | 80 | 4 | >500 |
| 28 | AlN | 50 | polyester | — | 4.8 | 0.10 | 6.8 | 79 | 99 | 57 | 6 | <300 |
| 29 | AlN | 50 | silicone | — | 5.0 | 0.10 | 6.7 | 78 | 99 | 55 | 5 | <300 |
| 30 | AlN | 50 | polyimide | — | 5.3 | 0.43 | 6.5 | 76 | 97 | 53 | 9 | >300 |
| 31 | AlN | 50 | silica | — | 5.6 | 0.08 | 6.3 | 75 | 99 | 51 | 10 | >500 |
| 32 | AlN | 50 | — | polyester | 3.1 | 0.06 | 8.6 | 89 | 99 | 74 | 5 | <300 |
| 33 | AlN | 50 | — | silicone | 3.1 | 0.06 | 8.5 | 89 | 99 | 74 | 5 | <300 |
| 34 | AlN | 50 | — | polyimide | 3.1 | 0.09 | 8.5 | 89 | 99 | 74 | 6 | >300 |
| 35 | AlN | 50 | — | silica | 3.1 | 0.05 | 8.5 | 89 | 99 | 73 | 5 | >500 |
| 36 | AlN | 50 | — | borosilicate glass | 3.2 | 0.06 | 8.4 | 89 | 99 | 73 | 6 | >500 |
| 37 | SiO$_2$ | 35 | — | — | 2.4 | 0.03 | 9.7 | 93 | 99 | 83 | 1.6 | >500 |
| 38 | SiO$_2$ | 50 | — | — | 1.9 | 0.03 | 10.8 | 96 | 99 | 90 | 1.2 | >500 |
| 39 | SiO$_2$ | 55 | — | — | 1.8 | 0.02 | 11.1 | 97 | 99 | 91 | 1.0 | >500 |
| 40 | SiO$_2$ | 50 | polyester | — | 3.2 | 0.08 | 8.4 | 88 | 99 | 72 | 4 | <300 |
| 41 | SiO$_2$ | 50 | silicone | — | 3.4 | 0.08 | 8.2 | 87 | 99 | 70 | 1.5 | <300 |
| 42 | SiO$_2$ | 50 | polyimide | — | 3.5 | 0.40 | 8.0 | 85 | 97 | 68 | 4 | >300 |
| 43 | SiO$_2$ | 50 | silica | — | 3.7 | 0.05 | 7.8 | 85 | 99 | 66 | 6 | >500 |
| 44 | SiO$_2$ | 50 | — | polyester | 2.0 | 0.03 | 10.5 | 96 | 99 | 88 | 1.5 | <300 |

TABLE 3-continued

| No. | Material | Porosity (%) | Impregnating material | Coating material | Relative dielectric constant $\epsilon_r$ | Dielectric loss tan σ(%) | Thickness (mm) | Wave transmittance (%) 2 GHz | 10 GHz | 25 GHz | Bending strength (kg/mm$^2$) | Heat resistance (° C.) |
|---|---|---|---|---|---|---|---|---|---|---|---|---|
| 45 | SiO$_2$ | 50 | — | silicone | 2.1 | 0.03 | 10.5 | 95 | 99 | 88 | 1.2 | <300 |
| 46 | SiO$_2$ | 50 | — | polyimide | 2.1 | 0.06 | 10.4 | 95 | 99 | 88 | 1.6 | >300 |
| 47 | SiO$_2$ | 50 | — | silica | 2.1 | 0.03 | 10.4 | 95 | 99 | 88 | 1.5 | >500 |
| 48 | SiO$_2$ | 50 | — | borosilicate glass | 2.1 | 0.03 | 10.3 | 95 | 99 | 87 | 1.5 | >500 |
| 49 | mullite | 40 | — | — | 3.1 | 0.06 | 8.5 | 89 | 99 | 73 | 7 | >500 |
| 50 | mullite | 50 | — | — | 2.6 | 0.05 | 9.3 | 92 | 99 | 80 | 5 | >500 |
| 51 | mullite | 55 | — | — | 2.4 | 0.05 | 9.8 | 94 | 99 | 80 | 5 | >500 |
| 52 | mullite | 50 | polyester | — | 4.3 | 0.10 | 7.3 | 82 | 99 | 61 | 7 | <300 |
| 53 | mullite | 50 | silicone | — | 4.5 | 0.10 | 7.1 | 81 | 99 | 59 | 5 | <300 |
| 54 | mullite | 50 | polyimide | — | 4.7 | 0.43 | 6.9 | 79 | 97 | 57 | 7 | >300 |
| 55 | mullite | 50 | silica | — | 5.0 | 0.08 | 6.7 | 78 | 99 | 56 | 9 | >500 |
| 56 | mullite | 50 | — | polyester | 2.7 | 0.06 | 9.1 | 91 | 99 | 78 | 5 | <300 |
| 57 | mullite | 50 | — | silicone | 2.7 | 0.06 | 9.1 | 91 | 99 | 78 | 5 | <300 |
| 58 | mullite | 50 | — | polyimide | 2.7 | 0.09 | 9.0 | 91 | 99 | 78 | 6 | >300 |
| 59 | mullite | 50 | — | silica | 2.8 | 0.05 | 9.0 | 91 | 99 | 78 | 6 | >500 |
| 60 | mullite | 50 | — | borosilicate | 2.8 | 0.06 | 8.9 | 91 | 99 | 77 | 6 | >500 |
| 61 | *Si$_3$N$_4$ | ~0 | — | — | 9.0 | 0.10 | 5.0 | 62 | 98 | 36 | 90 | >500 |
| 62 | *Al$_2$O$_3$ | ~0 | — | — | 8.5 | 0.10 | 5.1 | 63 | 98 | 38 | 40 | >500 |

As shown in Table 3, all of the above radomes exhibited satisfactory transmittance of radio wave and mechanical strength. In particular, the porous ceramic products subjected to neither coating nor impregnation and the porous ceramic products impregnated or coated with amorphous silica were excellent in heat resistance to withstand a temperature of as high as 500° C. or above in an oxidizing atmosphere.

As described above, the radomes of the present invention are sufficiently excellent in weather resistance and exhibits a far lower relative dielectric constant than that of radomes made of pore-free ceramics, and the porous ceramics, which constitute the radomes of the present invention, are superior to pore-free ceramics in machinability. Accordingly, the radomes of the present invention can accommodate to various kinds of radars. Among the radomes of the present invention, ones made by using porous ceramics coated or impregnated with resins are excellent also in tightness and strength.

What is claimed is:

1. A radome comprising a porous ceramic material obtained by sintering Si$_3$N$_4$ with a sintering aid selected from among rare earth element oxides, having a porosity of 35% to 55% by volume, the radome having a bending strength of at least 4 kg/mm$^2$ and a dielectric constant of 2.7 to 3.7.

2. A radome according to claim 1, wherein the at least one porous ceramic material is impregnated with a resin having a relative dielectric constant of 3.4 or below to fill the pores therewith.

3. A radome according to claim 2, wherein the resin having a relative dielectric constant of 3.4 or below is one or more members selected from the group consisting of polyesters, silicones, polyimides and epoxy resins.

4. A radome according to claim 1, wherein the at least one porous ceramic material is impregnated with at least one of amorphous silica and borosilicate glass to fill the pores therewith.

5. A radome having a dome-line shape consisting at least one porous ceramic plate and a fixing frame, the plate being optionally impregnated with a resin by a fixing frame, wherein the porous ceramic plate is constituted of a porous ceramic material obtained by sintering Si$_3$N$_4$ with a sintering aid selected from among rare earth element oxides, having a porosity of 35% to 55% by volume and the radome having a bending strength of at least 4 kg/mm$^2$ and a dielectric constant of 2.7 to 3.7.

6. A radome comprising a porous ceramic cylinder and a porous ceramic disc, the cylinder and/or disc being optionally impregnated with a resin, wherein the porous ceramic cylinder and the porous ceramic disk are constituted of a porous ceramic material obtained by sintering Si$_3$N$_4$ with a sintering aid selected from among rare earth element oxides, having a porosity of 35% to 55% by volume and the radome having a bending strength of at least 4 kg/mm$^2$ and a dielectric constant of 2.7 to 3.7.

7. A radome comprising of a porous ceramic material which is optionally impregnated with a resin, and has a parabolic or hemispherical shape, wherein the porous ceramic material is obtained by sintering Si$_3$N$_4$ with a sintering aid selected from among rare earth element oxides, having a porosity of 35% to 55% by volume and the radome having a bending strength of at least 4 kg/mm$^2$ and a dielectric constant of 2.7 to 3.7.

8. A radome according to claim 1, wherein the radome has a radio wave transmittance of at least 50% in a wide frequency range of from 2 to 25 GHz.

9. A radome according to claim 5, wherein the radome has a radio wave transmittance of at least 50% in a wide frequency range of from 2 to 25 GHz.

10. A radome according to claim 6, wherein the radome has a radio wave transmittance of at least 50% in a wide frequency range of from 2 to 25 GHz.

11. A radome according to claim 7, wherein the radome has a radio wave transmittance of at least 50% in a wide frequency range of from 2 to 25 GHz.

* * * * *